United States Patent [19]

Takemoto

[11] Patent Number: 5,278,669
[45] Date of Patent: Jan. 11, 1994

[54] IMAGE READING APPARATUS FOR AUTOMATICALLY SETTING UP IMAGE READING REGION AND METHOD THEREOF

[75] Inventor: Fumito Takemoto, Ashigarakami, Japan

[73] Assignee: Fuji Photo Film Co. Ltd., Kanagawa, Japan

[21] Appl. No.: 836,889

[22] Filed: Feb. 19, 1992

[30] Foreign Application Priority Data

Feb. 21, 1991 [JP] Japan .................................. 3-027589

[51] Int. Cl.$^5$ ........................ H04N 1/40; H04N 1/46; H04N 9/07
[52] U.S. Cl. .................................... 358/453; 358/500; 358/44; 358/518
[58] Field of Search ............... 358/405, 298, 406, 461, 358/468, 443, 453, 456, 451, 452, 44, 41, 75, 42, 80, 76, 448, 474, 449, 446; 364/521, 518, 900, 522; 340/703, 706, 747, 750

[56] References Cited

U.S. PATENT DOCUMENTS

| | | | |
|---|---|---|---|
| 4,591,904 | 5/1986 | Urabe et al. | 358/75 |
| 4,623,935 | 11/1986 | Mukai et al. | |
| 4,792,847 | 12/1988 | Shimazaki et al. | 358/80 |
| 5,053,867 | 10/1991 | Yamamoto et al. | 358/80 |
| 5,062,058 | 10/1991 | Morikawa | 358/75 X |
| 5,185,659 | 2/1993 | Itagaki et al. | 358/44 |
| 5,194,946 | 3/1993 | Morikawa et al. | 358/75 |
| 5,223,954 | 6/1993 | Miyakawa et al. | 358/474 |
| 5,231,518 | 7/1993 | Itoh et al. | 358/456 |

FOREIGN PATENT DOCUMENTS

0363988 4/1990 European Pat. Off. .

Primary Examiner—Paul Ip
Attorney, Agent, or Firm—Sughrue, Mion, Zinn, Macpeak & Seas

[57] ABSTRACT

An apparatus and a method of reading an image wherein processing conditions can be set up based on image data obtained by scanning image information recorded on an original to be read. The entire image reading region of a reading device with the original held therein is scanned to produce scanned data including the image data. A separator circuit compares the scanned data with given threshold data to separate the scanned data into first scanned data from the original and second scanned data from portions other than the original. An adder adds together either the number of pixels read from the first scanned data or the number of pixels read from the second scanned data along a main scanning direction for each given pitch extending in an auxiliary scanning direction, whereas another adder adds together either the number of pixels from the first scanned data or the number of pixels from the second scanned data along the main scanning direction for each given pitch extending in the main scanning direction. Each of first and second region setting-up circuits compares, for each given pitch, the number of the pixels added together along each of the main and auxiliary scanning directions with a given number of threshold pixels so as to determine an image reading region of the original, which extends in each of the main and auxiliary scanning directions.

5 Claims, 10 Drawing Sheets

IMAGE READING APPARATUS FOR AUTOMATICALLY SETTING UP IMAGE READING REGION AND METHOD THEREOF

BACKGROUND OF THE INVENTION

1. Field of the Invention

The present invention relates to an apparatus for and a method of reading an image wherein an image reading region for selecting a desired condition for processing an original to be read set in a reading device can automatically be set up.

2. Description of the Related Art

An image scanning reading and reproducing system has widely been used in the printing and platemaking fields, for example, for electrically processing image information stored in originals or subjects to be read so as to produce original film plates with a view toward simplifying working processes and improving the quality of printed images.

In an image reading apparatus of the image scanning reading and reproducing system, image information is read by scanning an original to be read, which is contained in an original cassette.

More specifically, when original film plates, which meet various purposes, are produced in the image reading apparatus, a so-called pre-scan operation or process for firstly feeding the original cassette to a reading unit and then setting up conditions (hereinafter called "processing conditions") composed of magnification selection, a set-up of image processing, etc. is carried out. Then, a so-called main-scan operation or process for setting up the optimum processing conditions based on image information obtained by the pre-scan process and reading the image information again in accordance with the processing conditions is performed.

When the main-scan process is carried out after the image information has been pre-scanned in the above-described manner, suitable processing conditions cannot be set up so long as unnecessary information is included in the pre-scanned image information for the setting up of the processing conditions.

In order to avoid such inconvenience, there has been proposed a method of specifying in advance, for example, the size of each of originals to be read contained for every original cassettes, the positions at which the originals are contained in the original cassettes and reading only desired image information in accordance with this specification or a method of displaying image information obtained by the pre-scan process on a monitor and cutting away a desired region by trimming.

In the proposed methods referred to above, however, dedicated original cassettes are required for every original sizes, and the positions of the originals to be contained in the original cassettes must accurately be set up. When the desired region is trimmed, the region to be trimmed by an operator tends to vary, thereby causing a problem that processing conditions cannot be held constant.

SUMMARY OF THE INVENTION

It is a principal object of the present invention to provide an apparatus for and a method of reading an image wherein an image reading region of an original to be read can automatically be set up without specifying the size of the original, the position of the original to be set in a reading unit, etc.

It is another object of the present invention to provide an image reading apparatus for setting up processing conditions based on image data obtained by scanning image information recorded on an original to be read, the image reading apparatus comprising a reading unit for scanning the entire image reading region of a reading device with the original held therein so as to read scanned data including the image data, a separating circuit for comparing the scanned data with given threshold data so as to separate the scanned data into first scanned data read from the original and second scanned data read from portions other than the original, a first adding circuit for adding together either the number of pixels read from the first scanned data of the scanned data separated into the first and second scanned data or the number of pixels read from the second scanned data thereof along a main scanning direction for each given pitch extending in an auxiliary scanning direction, a first region setting-up circuit for comparing, for each given pitch, the number of the pixels added together along the main scanning direction with a predetermined number of threshold pixels so as to determine an image reading region of the original, which extends in the auxiliary scanning direction, a second adding circuit for adding together either the number of pixels read from the first scanned data or the number of pixels read from the second scanned data along the auxiliary scanning direction for each given pitch extending in the main scanning direction, and a second region setting-up circuit for comparing, for each given pitch, the number of the pixels added together along the auxiliary scanning direction with the predetermined number of the threshold pixels so as to determine an image reading region of the original, which extends in the main scanning direction, whereby given processing conditions are set up based on image data set in an image reading region determined by the image reading region of the original extending in the auxiliary scanning direction and the image reading region of the original extending in the main scanning direction.

It is a further object of the present invention to provide an image reading apparatus wherein the first and/or second region setting-up circuit includes a region selecting circuit for selecting an image reading region having a maximum width as either the image reading region of the original extending in the auxiliary scanning direction or the image reading region of the original extending in the main scanning direction when either the image reading region defined by comparing the number of the pixels added together along the main scanning direction with the predetermined number of the pixels or the region defined by comparing the number of the pixels added together along the auxiliary scanning direction with the predetermined number of the pixels is formed as a plural region.

It is a still further object of the present invention to provide an image reading apparatus wherein the reading unit comprises a light source for applying illuminating light to the original, an auxiliary scanning drive mechanism for displacing the original in the auxiliary scanning direction, a focusing lens for focusing either transmitted one of the illuminating light applied to the original or light reflected from the original, and a plurality of photoelectric converter elements for reading image information on the original produced by focusing either the transmitted one or the reflected light with the focusing lens.

It is a still further object of the present invention to provide a method of reading an image wherein processing conditions are set up based on image data obtained by scanning image information recorded on an original to be read, the method comprising the following steps: a first step of scanning the entire image reading region of a reading device with the original held therein so as to read scanned data including the image data, a second step of comparing the scanned data with given threshold data so as to separate the scanned data into first scanned data read from the original and second scanned data read from portions other than the original, a third step of adding together either the number of pixels read from the first scanned data of the scanned data separated into the first and second scanned data or the number of pixels read from the second scanned data thereof along a main scanning direction for each given pitch extending in an auxiliary scanning direction, a fourth step of comparing, for each given pitch, the number of the pixels added together along the main scanning direction with a predetermined number of threshold pixels so as to determine an image reading region of the original, which extends in the auxiliary scanning direction, a fifth step of adding together either the number of pixels read from the first scanned data or the number of pixels read from the second scanned data along the auxiliary scanning direction for each given pitch extending in the main scanning direction, a sixth step of comparing, for each given pitch, the number of the pixels added together along the auxiliary scanning direction with the predetermined number of the threshold pixels so as to determine an image reading region of the original, which extends in the main scanning direction, and a seventh step of setting up given processing conditions based on image data set in an image reading region determined by the image reading region of the original extending in the auxiliary scanning direction and the image reading region of the original extending in the main scanning direction.

It is a still further object of the present invention to provide an image reading method wherein the given processing conditions in the seventh step comprise scanning conditions and image processing conditions, the scanning conditions being composed of selection of an image reading region on the original, reading magnification, turning angle at the time of reading of the original, the type of halftone at the time of the halftone scanning, the number of lines on the screen, and color plates in an original film plate, and a judgment made as to whether borders (edges) with respect to the original film plate have been set up, a judgment made as to whether resist marks have been applied and a judgment made as to whether an exposure condition at the time of the color separation of the original has been set up, and the image processing conditions being composed of set-ups of the densities of highlights and shadows, dot percent, gradation, color correction and sharpness, and undercolor removal or the like with respect to the original film plate.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENTS

Figure 1:
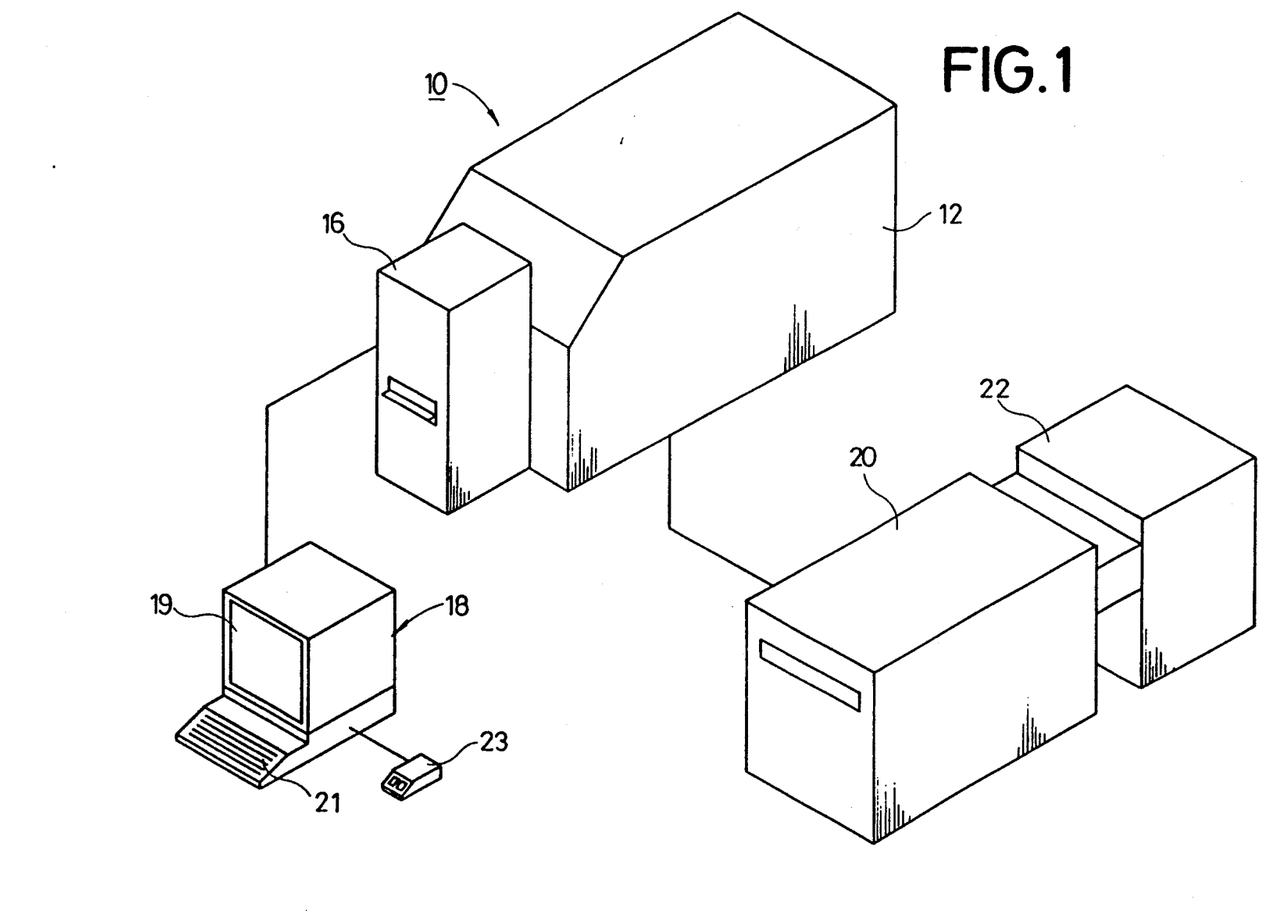
FIG. 1 is a view showing the structure of an image scanning reading and reproducing system to which an image reading apparatus according to one embodiment of the present invention is applied.

In FIG. 1, reference numeral 10 indicates an image scanning reading and reproducing system. The image scanning reading and reproducing system 10 basically comprises an image reading apparatus 12 according to one embodiment of the present invention, an original cassette feeding apparatus 16 capable of automatically feeding an original cassette 14 (see FIG. 2) with a light-transmissive type original S to be read held therein to the image reading apparatus 12, a console 18 for manipulating the image reading apparatus 12, an image output apparatus 20 for reproducing, as an output, image information read by the image reading apparatus 12 on a photographic film, and an automatic photographic processor 22 for developing the film to produce an original film plate. Incidentally, the console 18 has a CRT display 19 for displaying image information or the like thereon, a keyboard 21 and a mouse 23.

Figure 2:
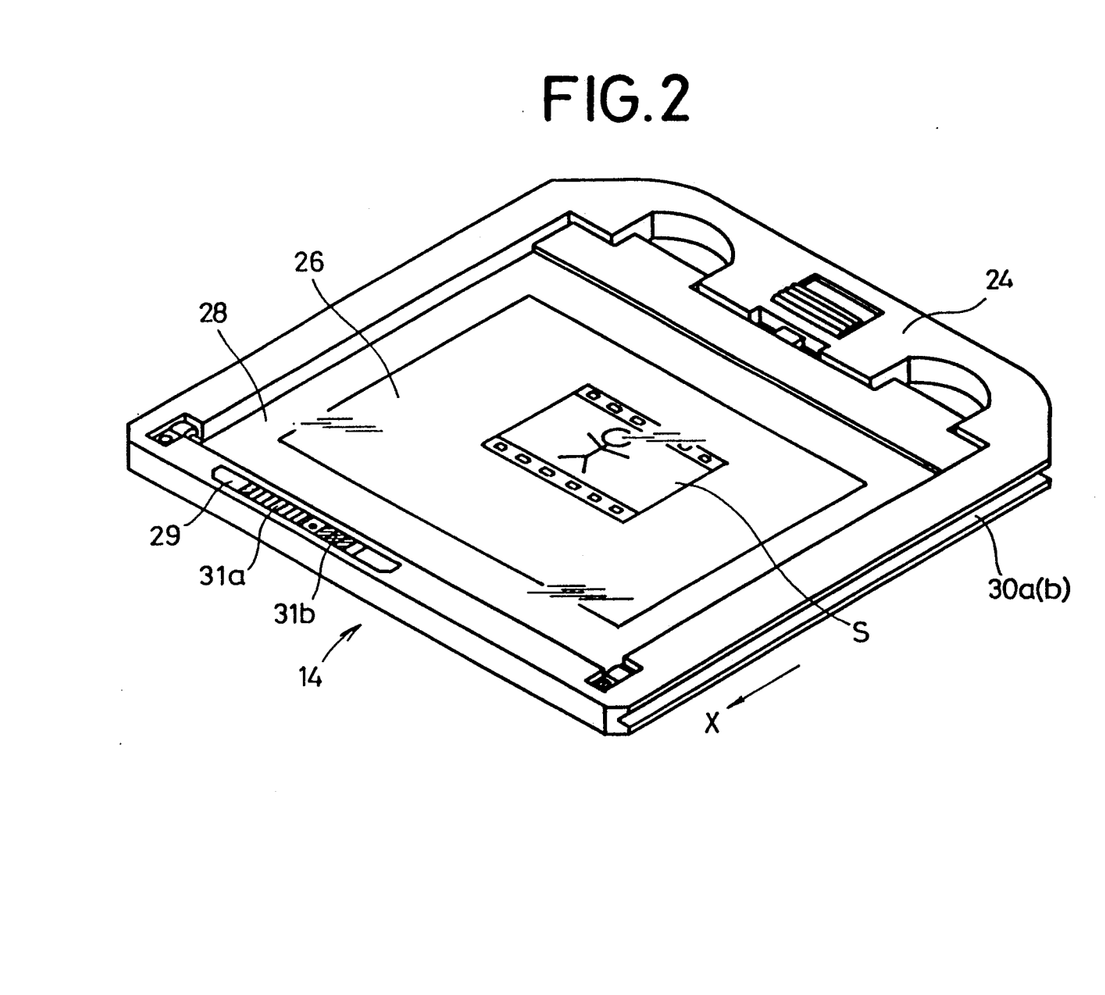
FIG. 2 is a perspective view illustrating an original cassette loaded in the image reading apparatus shown in FIG. 1.

The original cassette 14 shown in FIG. 2 is provided with a mask (light-intransmissive plate) 28 used for a photographic film as being of the size of 4"×5", the mask 28 being disposed between two support glass panels 26 enclosed by a frame 24 shaped substantially in the form of a square, and is used to hold a light-transmissive original S as being of a 135-mm film in an opening or aperture of the mask 28. In addition, the original cassette 14 has V-shaped grooves 30a, 30b which are defined in opposite sides thereof extending in an auxiliary scanning direction (i.e., in the direction indicated by the arrow X) to feed the original cassette 14 toward the image reading apparatus 12 and which extend along the original-cassette feeding direction. On an upper surface of the leading end of the frame 24, which extends in the direction in which the original cassette 14 is fed, there is also disposed a cassette identifying unit 29 for identifying the original cassette 14 and the original S stored therein. The cassette identifying unit 29 is made up by a combination of a plurality of light-transmissive portions 31a and light-intransmissive portions 31b in order to identify the original cassette 14 and the type of the original S stored therein.

Figure 3:
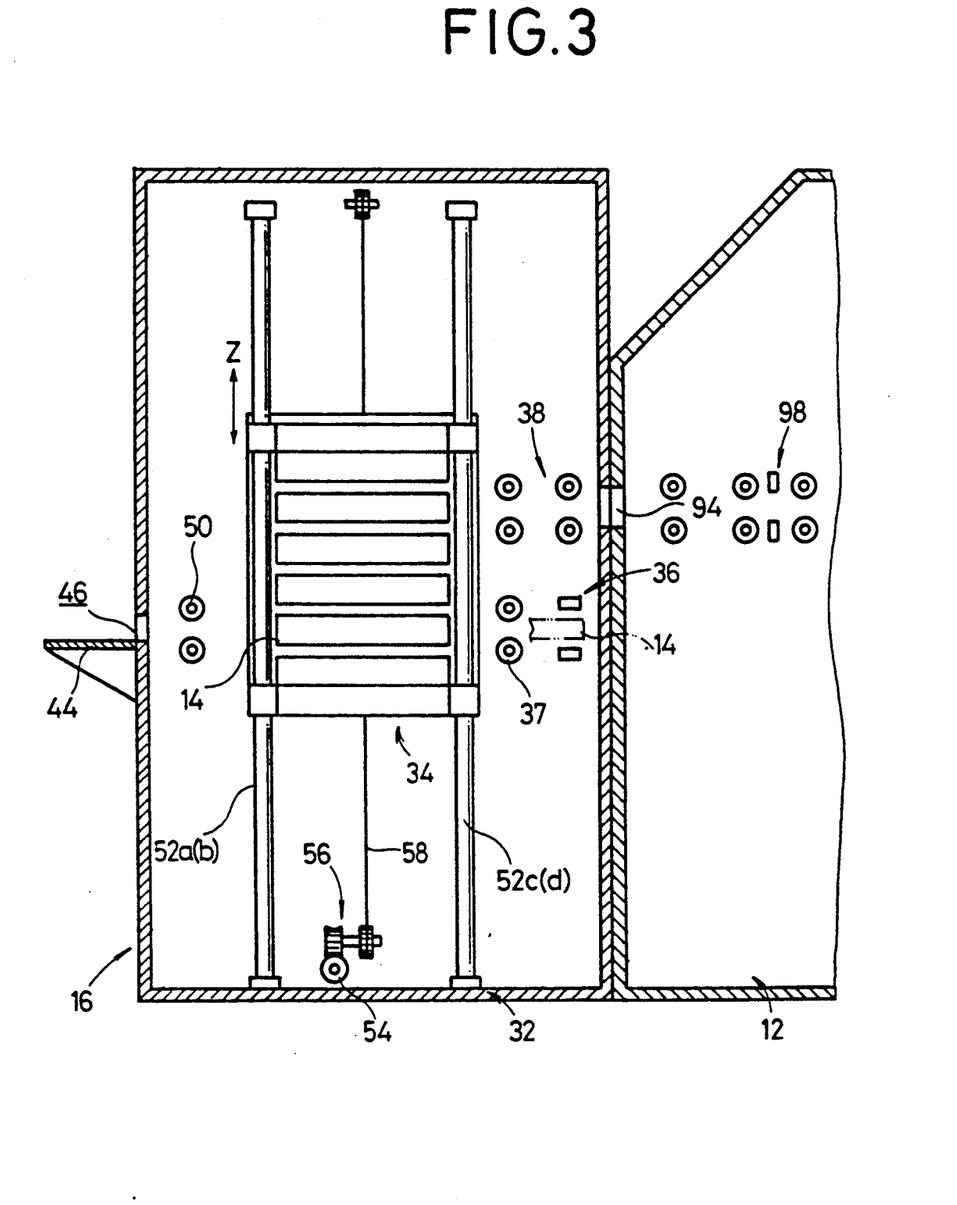
FIG. 3 is a cross-sectional view depicting an original cassette feeding apparatus shown in FIG. 1.

FIG. 3 illustrates the structure of the original cassette feeding apparatus 16. The original cassette feeding apparatus 16 is surrounded by a casing 32, and comprises a cassette holding means 34 for accommodating the original cassette 14 therein, a cassette identifying means 36 for identifying the original cassette 14, and a cassette feeding means 38 for feeding the original cassette 14 stored in the cassette holding means 34 to the image reading apparatus 12 to which the original cassette feeding apparatus 16 is connected.

The original cassette feeding apparatus 16 has a cassette insertion table 44 disposed in front of the original cassette feeding apparatus 16 and a cassette insertion hole 46 defined in the frontal part thereof. A pair of feed-in or insertion rollers 50 for inserting the original cassette 14 into the original cassette feeding apparatus 16 is disposed in its internal position corresponding to the cassette insertion hole 46.

The cassette identifying means 36 is made up by a combination of a plurality of light-emitting devices and light-detecting devices. In addition, the cassette identifying means 36 reads data set in the cassette identifying unit 29 of the original cassette 14 delivered by a pair of feed rollers 37 to identify the original cassette 14 and the type of the original S or the like.

The cassette holding means 34 comprises a cage which is supported by four guide bars 52a through 52d provided upright within the casing 32. In addition, the cassette holding means 34 can be moved in upward and downward directions (i.e., in the direction indicated by the arrow Z) by a worm gear 56 coupled to an electric motor 54 and a chain 58.

Figure 4:
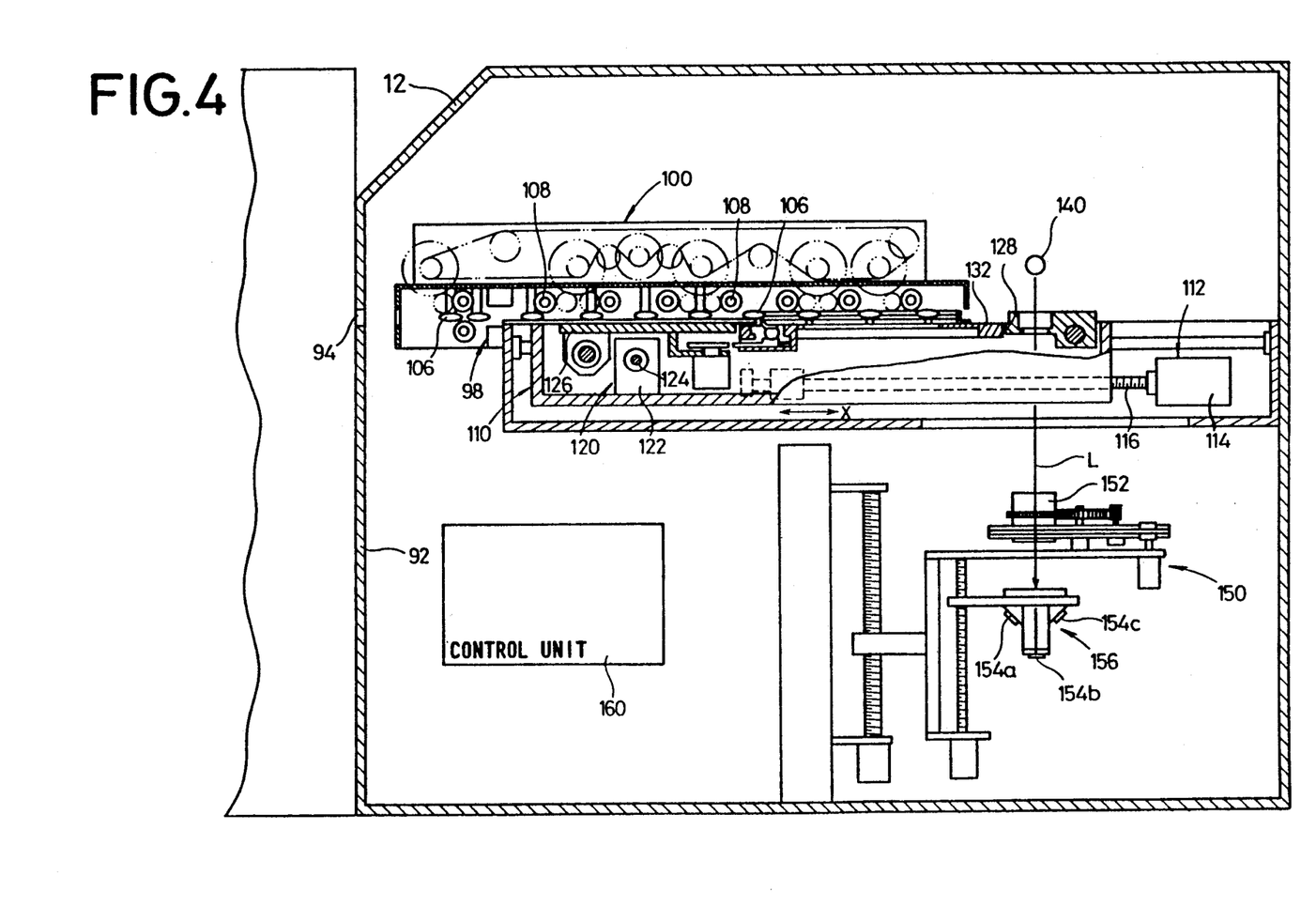
FIG. 4 is a cross-sectional view showing the image reading apparatus depicted in FIG. 1.

Referring now to FIG. 4, the image reading apparatus 12 surrounded by a casing 92 has a cassette insertion hole 94 defined therein, which communicates with the original cassette feeding apparatus 16. In the image reading apparatus 12, there is disposed near the cassette insertion hole 94, an identifying mechanism 98 for identifying the original cassette 14 and the type of the original S stored in the original cassette 14. Incidentally, the identifying mechanism 98 is constructed in a manner similar to the cassette identifying means 36 disposed in the original cassette feeding apparatus 16.

On the other hand, one end of a feed mechanism 100 is disposed near the identifying mechanism 98, whereas the other end thereof extends to a position above a turntable 132 to be described later. The feed mechanism 100 has a plurality of guide rollers 106, which are held in point-to-point contact with the V-shaped grooves 30a, 30b of the original cassette 14. In addition, the feed mechanism 100 also has a plurality of feed rollers 108 which are brought into contact with a feed surface of the frame 24 of the original cassette 14 and which feed the original cassette 14 in a desired direction. Below the feed mechanism 100, there is disposed an original table 110 which is movable back and forth in an auxiliary scanning direction (i.e., in the direction indicated by the arrow X) by an auxiliary scanning mechanism 112. The auxiliary scanning mechanism 112 includes a rotative drive source 114 to which there is coupled a ball screw 116 that moves the original table 110 in the direction indicated by the arrow X.

The original table 110 has a trimming mechanism 120 for moving the original cassette 14 back and forth in a trimming direction, i.e., in a direction normal to the auxiliary scanning direction (i.e., in the direction indicated by the arrow X). The trimming mechanism 120 has a rotative drive source 122 mounted on the original table 110, which in turn rotates a ball screw 124 so as to move a trimming table 126 back and forth in the direction normal to the auxiliary scanning direction. The trimming table 126 has an aperture 128 which extends therethrough. A turntable 132 is mounted in the aperture 128 and supports thereon an unillustrated mechanism for rotating the original cassette 14 through a predetermined angle.

There is also disposed within the casing 92, a light source 140 which constitutes a transmissive illuminating mechanism. In addition, an image reading unit 150 serving as a reading means for photoelectrically reading illuminating light L emitted from the light source 140 is disposed below the light source 140. The image reading unit 150 has a converging or focusing lens 152 and a photoelectrically converting unit 156 comprising a plurality of CCDs 154a through 154c. In addition, the image reading unit 150 photoelectrically reads image information carried by the original S as image information corresponding to the colors of R, G, and B.

The image reading apparatus 12 constructed as described above is driven under control by the control unit 160.

Figure 5:
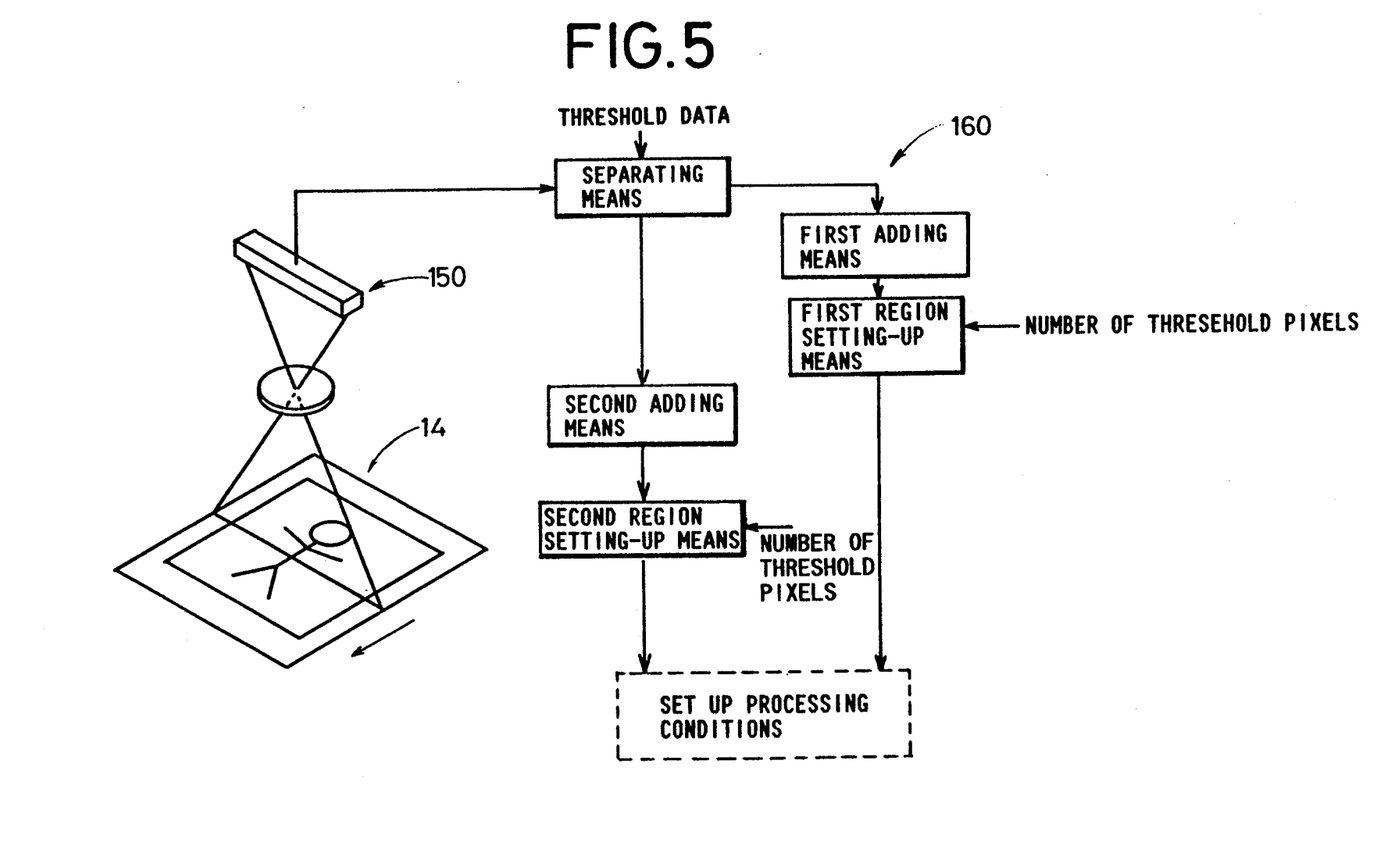
FIG. 5 is a block diagram illustrating the functional relationships among the respective parts of a control unit shown in FIG. 4.

FIG. 5 is a functional block diagram of the control unit 160.

The control unit 160 comprises a separating means for causing the image reading unit 150 to make a comparison between data read from the original cassette 14 along the main scanning direction and given threshold data and between data read from the original cassette 14 along the auxiliary scanning direction and the given threshold data thereby to separate the results of the comparison into two data, i.e., data read from an original to be read and data other than the data read from the original, i.e., the data read from portions other than the original, a first adding means for successively adding together the number of pixels read from the data, other than the data read from the original, of the data read along the main scanning direction which are separated into the two data referred to above, and a first region setting-up means for setting up, based on the result obtained by making a comparison between the number of the pixels added and given number of threshold pixels, a region at which an image is read along the main scanning direction.

Further, the control unit 160 includes a second adding means for successively adding together the number of pixels read from the data, other than the data read from the original, of the data read along the auxiliary scanning direction which are separated into the data read from the original and the data other than the data read from the original, and a second region setting-up means for setting up, based on the result obtained by making a comparison between the result of the addition by the second adding means, i.e., the number of the pixels added and the given number of the threshold pixels, a region at which an image is read along the auxiliary scanning direction.

Then, given processing conditions are set up based on the image reading regions established by the first and second region setting-up means.

Figure 6:
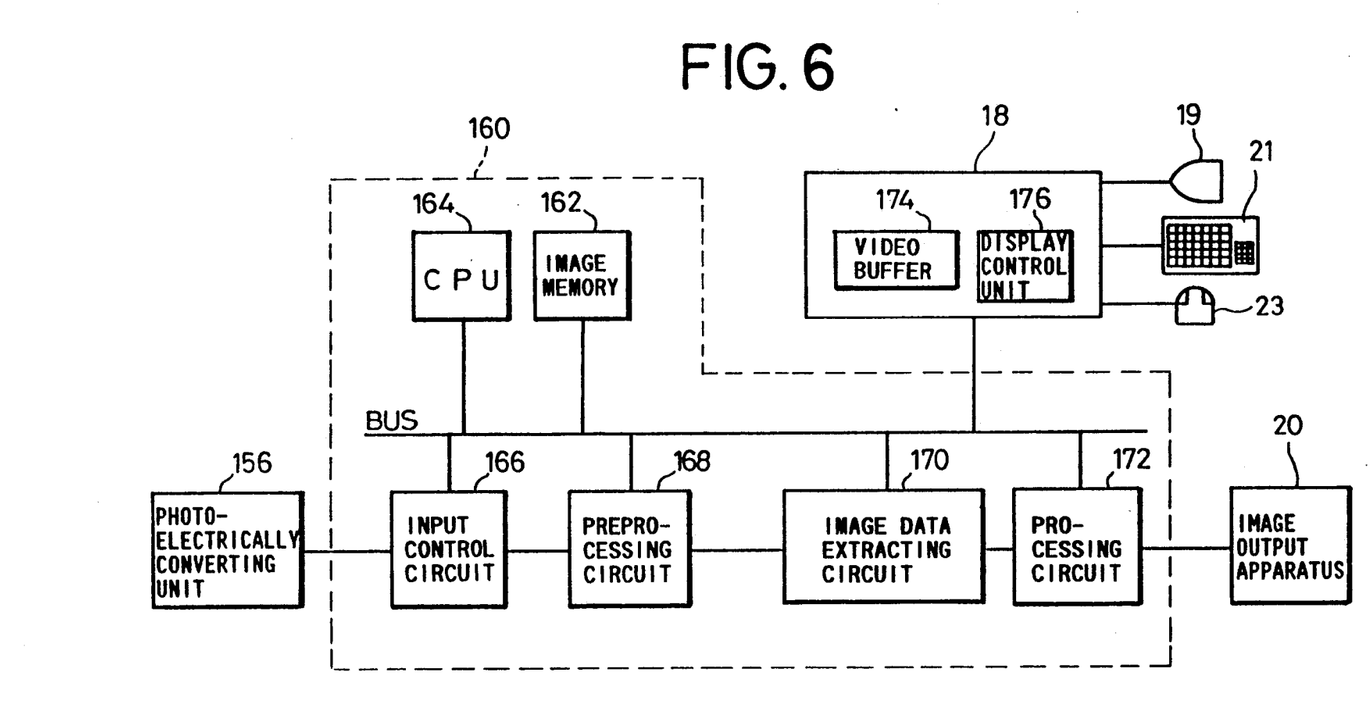
FIG. 6 is a block diagram showing the structure of the control unit depicted in FIG. 4.

FIG. 6 shows the structure of the control unit 160 having the above-described functions.

The control unit 160 includes an image memory 162, a CPU 164, an input control circuit 166, a preprocessing circuit 168, an image data extracting circuit 170 and a processing circuit 172, all of which are electrically connected to the console 18 and the image output apparatus 20.

The console 18 has a video buffer 174, a display control unit 176, and an unillustrated interface circuit. The video buffer 174 and the display control unit 176 exert output control over the CRT display 19. The unillustrated interface circuit transfers various instructions input from the keyboard 21 and the mouse 23 to the control unit 160.

The image memory 162 stores scanned data read by the photoelectrically converting unit 156 therein, and the CPU 164 performs general control over the image reading apparatus 12. The input control circuit 166 determines the type of the original cassette 14 to be read and the like, and controls a region to be read by the photoelectrically converting unit 156 and the like. The preprocessing circuit 168 pre-processes the scanned data obtained from the photoelectrically converting unit 156 and sends thus pre-processed data to the console 18 and the image data extracting circuit 170.

The image data extracting circuit 170 eliminates unnecessary data around an image from data obtained by scanning the original S. The processing circuit 172 electrically processes an image to be output to the image output apparatus 20.

In this case, the image data extracting circuit 170 serves as the separating means, the first and second adding means, the first and second region setting-up means and a region selecting means.

A process for producing an original film plate using the image scanning reading and reproducing system 10 constructed as described above will now be described.

Figure 7:
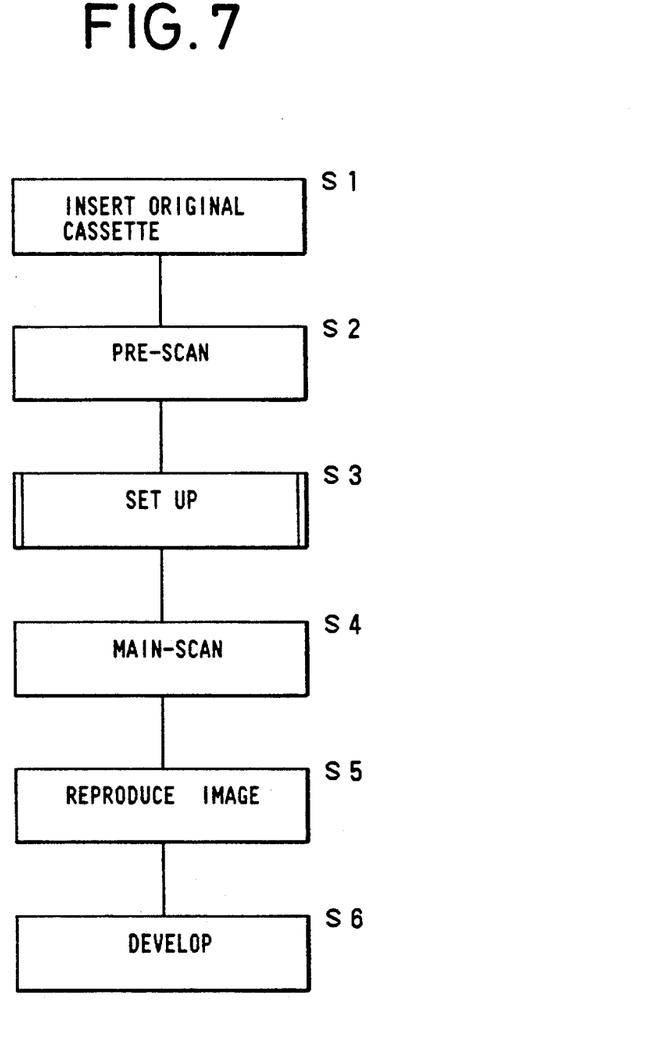
FIG. 7 is a schematic flowchart for describing reading and reproducing processes of the image scanning reading and reproducing system shown in FIG. 1.

A description will first be made of an overall routine procedure for reading image information from the original S and producing an original film plate with reference to FIG. 7.

First, an original cassette 14 with a desired original S stored therein is inserted from the cassette insertion hole 46 of the original cassette feeding apparatus 16 shown in FIG. 2 (Step S1). At this time, the original cassette feeding apparatus 16 is activated to rotate the insertion rollers 50 and the feed rollers 37 so as to feed the original cassette 14 to the cassette identifying means 36 through the cassette holding means 34.

When the leading end of the original cassette 14 reaches the cassette identifying means 36, information, which has been written into the cassette identifying unit 29 mounted on the leading end of the original cassette 14, is read, so that the original cassette 14 and the type of the original S are identified by the input control circuit 166.

When the above information is read, the original cassette 14 is returned to a given position in the cassette holding means 34. Then, the motor 54 is energized to cause the worm gear 56 and the chain 58 to move the cassette holding means 34 in the direction indicated by the arrow Z. Thereafter, the cassette feeding means 38 is actuated to feed the original cassette 14 to the image reading apparatus 12 through the cassette insertion hole 94.

The identifying mechanic am 98 of the image reading apparatus 12 serves to identify the original cassette 14. Then, the feed rollers 108 are rotated to feed the original cassette 14 to the turntable 132 while the original cassette 14 is being held by the guide rollers 106 held in point-to-point contact with the V-shaped grooves 30a, 30b.

After the original cassette 14 has been delivered to a given position on the turntable 132, the auxiliary scanning mechanism 112 is actuated to feed the original cassette 14 in the direction indicated by the arrow X, i.e., in the auxiliary scanning direction together with the original table 110. As a result, a so-called prescan process for obtaining image information used to set up processing conditions is performed by the image reading unit 150 (Step S2).

More specifically, the illuminating light L emitted from the light source 140 passes through the original S stored in the original cassette 14, followed by travelling to the CCDs 154a through 154c of the photoelectrically converting unit 156 through the focusing lens 152. The CCDs 154a through 154c then convert the illuminating light L which has passed through the original S into an electric signal. The electric signal thus converted is subjected to a predetermined process in the preprocessing circuit 168 of the control unit 160, and thereafter, the electric signal thus processed is stored in the image memory 162 as the scanned data and displayed on the CRT display 19 of the console 18.

On the other hand, the image data extracting circuit 170 extracts only desired image data from the scanned data as will be described below and causes the image memory 162 to store the same therein as pre-scan image data. Then, the console 18 and the processing circuit 172 are used to set up processing conditions for the pre-scan image data (Step S3).

Incidentally, the processing conditions represent those for producing a desired original film plate, and can be classified into scanning conditions and image processing conditions. In this case, the scanning conditions are composed of selection of, for example, a reading region of an original S (trimming), magnification, turning angle at the time of reading of the original S, the type of halftone at the time of the halftone scanning, the number of lines on the screen, and color plates (Y, M, C, K) in an original film plate; a judgment made as to whether borders (edges) with respect to the original film plate have been set up; a judgment made as to whether resist marks have been applied; and a judgment made as to whether an exposure condition at the time of the color separation of the original S has been set up. On the other hand, the image processing conditions are composed of set-ups of, for example, the densities of highlights and shadows, dot percent, gradation, color correction and sharpness, and undercolor removal or the like with respect to the original film plate. The condition for the selection of the reading region of the original S, of the scanning conditions, is automatically set up by a method which will be described later.

The original cassette 14, which has been subjected to the pre-scan process (Step S2) and the set-up process (Step S3), is then scanned (main-scanned) at the image reading unit 150 based on the processing conditions referred to above, so that image data (mainscan image data) used as an output for reproduction can be produced by the processing circuit 172 (Step S4).

The main-scan image data is then sent to the image output apparatus 20, where it is converted into a light signal such as a laser beam. Thereafter, the light signal thus converted is reproduced on a photographic film as an image (Step S5). The photographic film is delivered to the automatic photographic processor 22, where it is developed to produce a desired original film plate (Step S6).

The method of producing the original film plate is roughly carried out in the above-described manner. A method of automatically setting up the reading region of the original S at the time of the set-up (Step S3) will now be described in detail in accordance with a flowchart shown in FIG. 8. Let's now assume that, for example, the original cassette 14 is used for a photographic film having the size of 4"×5" and a single 135-mm film is loaded in the cassette 14.

Figure 8:
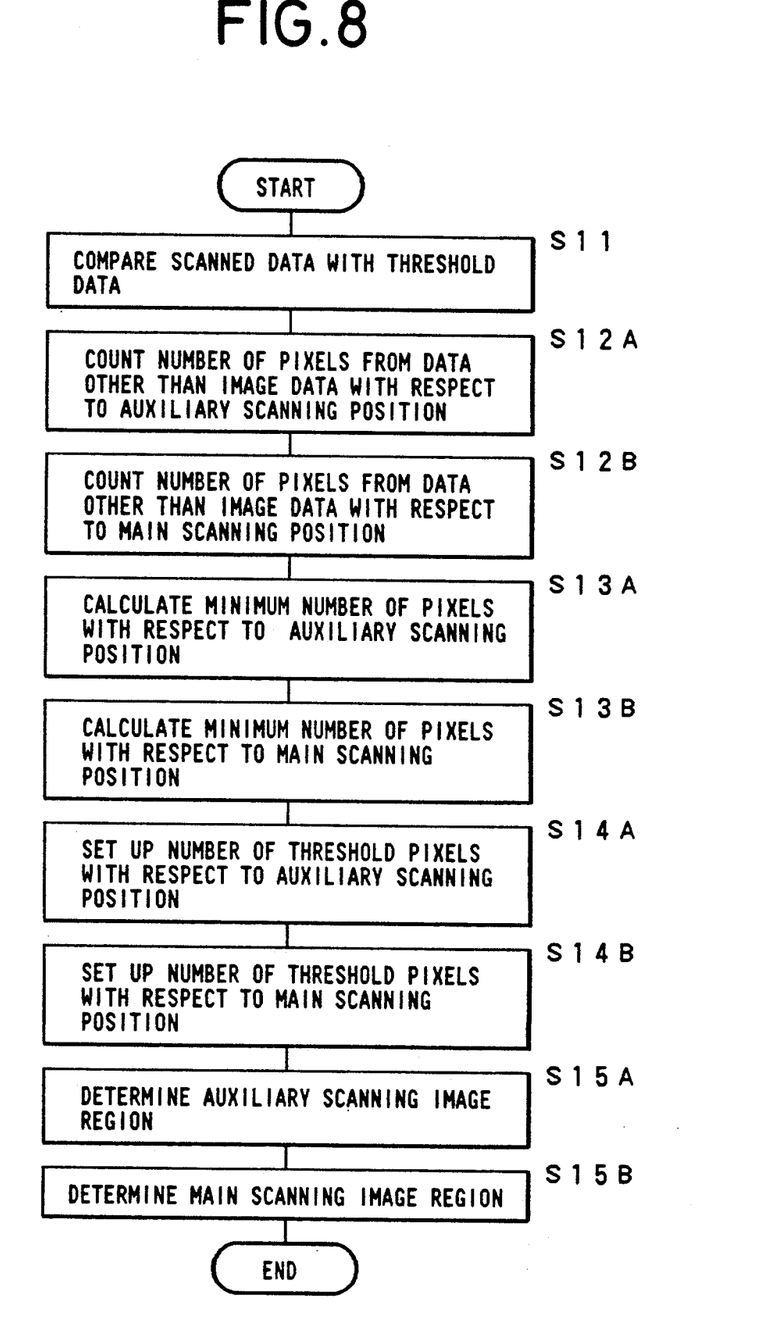
FIG. 8 is a flowchart for describing, in detail, a set-up executed in the flowchart shown in FIG. 7.
Figure 9:
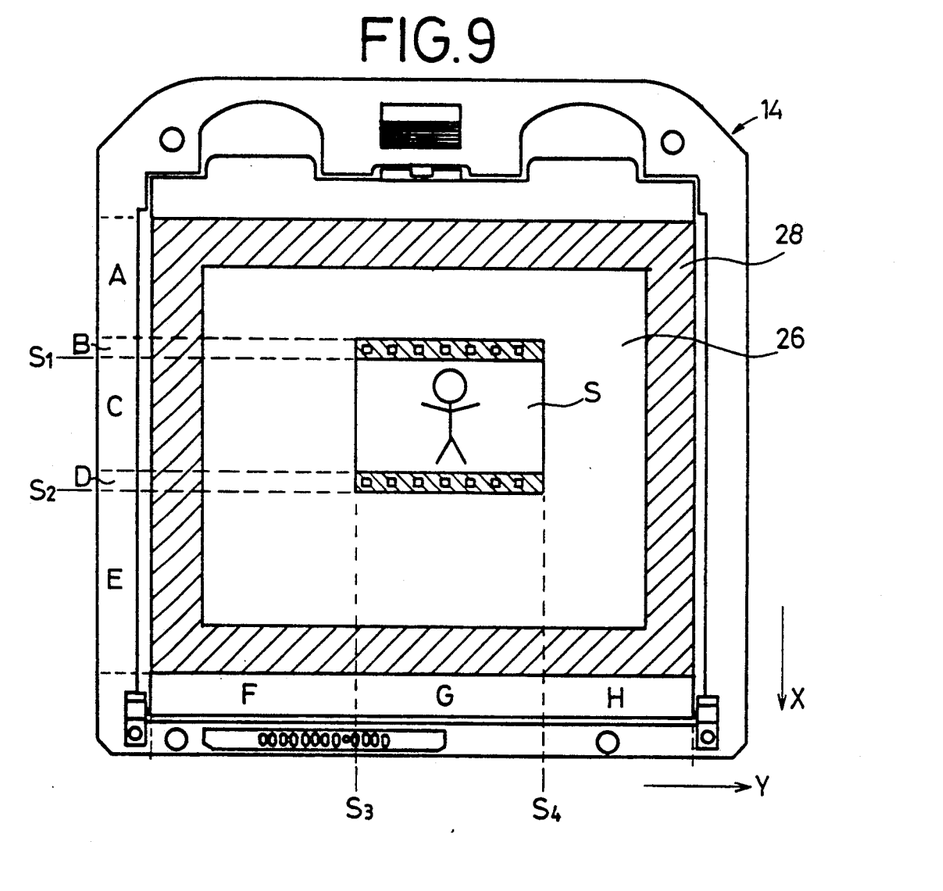
FIG. 9 is a view for describing the original cassette employed at the time of the set-up of the flowchart shown in FIG. 7.

First of all, the scanned data stored in the image memory 162 is compared with the given threshold data, thereby separating the scanned data into two data, i.e., data read from the original S and data read from the portions other than the original S (Step S11). That is, when the color density of the mask 28 as the light-intransmissive portion at the reading region of the cassette 14 is represented by $D_S$ and the color density of each support glass panel 26 as the light-transmissive portion is represented by $D_H$ ($D_S > D_H$) as shown in FIG. 9, the color density D of the original S is represented by $D_S > D > D_H$, thereby enabling the selection or separation of the scanned data.

Then, the number of pixels read out of data from the portions other than the original S, of the scanned data separated into the two data in Step S11, is successively added together along the main scanning direction (i.e., along the direction indicated by the arrow Y) to count or determine the sum. Further, such an additive arithmetic operation is performed for each given pitch extending in the auxiliary scanning direction (i.e., in the direction indicated by the arrow X) (Step S12A). In this case, the original S to be read does not exist in A and E regions shown in FIG. 9 of regions divided in the auxiliary scanning direction. Therefore, the number of pixels added together is represented by $L_{MAX}$ corresponding to the maximum value, i.e., the maximum number of pixels read along the main scanning direction. Since B and D regions respectively have perforations extending through the original S, a portion indicative of the minimum number of pixels $L_{MIN}$ of the light-intransmissive portion and a portion indicative of the middle or intermediate number of pixels $L_P$ ($L_{MAX} > L_P > L_{MIN}$), of the light-intransmissive portion are produced. A C region represents a desired image portion in the original S. Since the desired portion corresponds to a light-semitransmissive portion of the original S, the number of pixels at that portion reaches the minimum value, i.e., the minimum number of pixels $L_{MIN}$ (see FIG. 10).

Similarly, the number of pixels read out of data from the portions other than the original S, of the scanned data separated into the two data in Step S11, is successively added together along the auxiliary scanning direction (i.e., along the direction indicated by the arrow X) to determine the result of the addition, i.e., the sum. Further, such an additive arithmetic operation is performed for each given pitch along the main scanning direction (i.e., along the direction indicated by the arrow Y) (Step S12B). At this time, the original S to be read does not exist in F and H regions shown in FIG. 9 of regions divided in the main scanning direction. Therefore, the number of pixels added together is represented by $T_{MAX}$ as the maximum value read in the auxiliary scanning direction. In addition, a G region represents the desired image portion in the original S. Since the portion referred to above corresponds to the light-semitransmissive portion of the original S, the number of pixels at that portion assumes a value which varies in the vicinity of $T_{MIN}$ regarded as the minimum value. Incidentally, this variation depends on the presence of the perforations extending through the original S (see FIG. 11).

The minimum value $L_{MIN}$ with respect to the auxiliary scanning position and the minimum value $T_{MIN}$ with respect to the main scanning position are then determined based on the number of the pixels counted in Step S12A (Steps S13A and S13B).

Further, the number of threshold pixels $\alpha_1$ with respect to the auxiliary scanning position and the number of threshold pixels $\alpha_2$ with respect to the main scanning position are set up based on the minimum values $L_{MIN}$, $T_{MIN}$ (Steps S14A and S14B). These $\alpha_1$, $\alpha_2$ are established in accordance with the following equations. Incidentally, $\beta$ is a value preset according to the type of the cassette 14 or the like, and is set up in such a manner as to meet $L_P > \alpha_1 > L_{MIN}$ and $$T_{MAX} > \alpha_2 > T_{MIN}.$$

$$\alpha_1 = L_{MIN} + \beta$$

$$\alpha_2 = T_{MIN} + \beta$$

Figure 10:
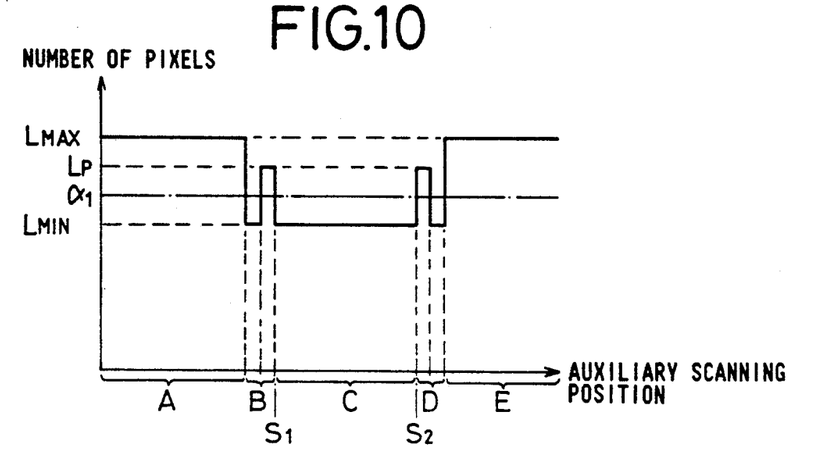
FIG. 10 is a view for describing the number of pixels read when an original to be read is scanned in an auxiliary scanning direction.
Figure 11:
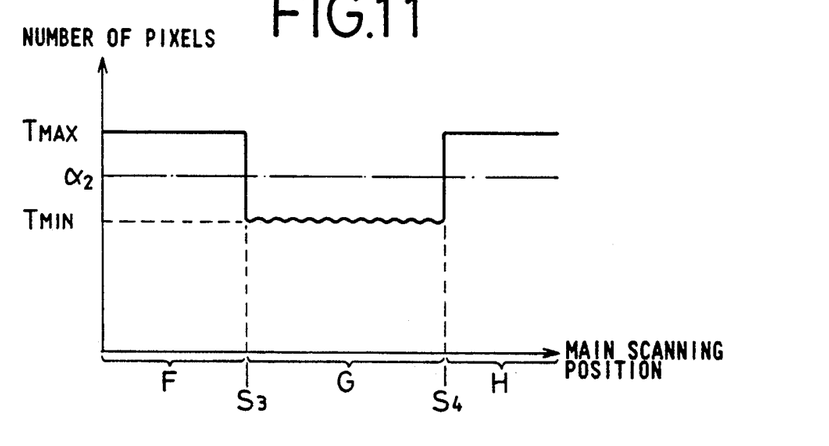
FIG. 11 is a view for describing the number of pixels read when the original to be read is scanned in a main scanning direction.

Then, these values $\alpha_1$, $\alpha_2$ are respectively compared with the number of the pixels shown in FIGS. 10 and 11 so as to determine an image region between $S_1$ and $S_2$ extending in the auxiliary scanning direction and an image region between $S_3$ and $S_4$ extending in the main scanning direction (Steps S15A and S15B). When the image region between $S_1$ and $S_2$ is determined at this time, a broader C region can be selected from the narrow B, D regions and the wide C region.

As described above, an image region on an original S to be read can automatically be recognized and set up. It is therefore possible to avoid, for example, a misset-up of the image region, which is developed by a manual operation of an operator or a shift of set-up positions, which takes place owing to the difference in ability among individuals or the like. Further, each of processing conditions can be set up at a constant level at all times. Since the original S can be used without defining the perforations mentioned above therein, processing conditions can be set up with higher accuracy. In addition, the processing conditions can be set up without taking into special consideration the position of the original S with respect to the cassette 14, the size of the original S, etc. It is therefore unnecessary to prepare in advance a cassette 14 corresponding to an original S, for example. Accordingly, a single cassette 14 may be used in common. As a result, the manufacturing cost can further be reduced.

In the above-described embodiment, the processing order of Steps S12A and S12B may arbitrarily be selected. Similarly, either one of Steps S13A and S13B, either one of Steps S14A and S14B and either one of Steps S15A and S15B may be selected as a first processing step. Further, the original S is applicable to photographic films such as a Brownie film, etc., other than a perforated 135-mm film.

The present invention can be applied even to a case in which processing conditions are set up in apparatuses such as a copying machine, etc., other than the image scanning reading and reproducing system for producing the original film plate.

According to the image reading apparatus of the present invention, as has been described above, a region for desired image information can automatically be set up without paying attention to a shift of a position at which an original to be read is set up, the size of the original, etc. As a result, a difference in the level at which processing conditions are set up, which occurs owing to the difference in ability among operators and the like, can be removed, so that a desired processed image of a constant level can be obtained at all times.

Having now fully described the invention, it will be apparent to those skilled in the art that many changes and modifications can be made without departing from the spirit or scope of the invention as set forth herein.

What is claimed is:

1. An image reading apparatus for setting up processing conditions based on image data obtained by scanning image information recorded on an original to be read, said image reading apparatus comprising:
    a reading unit for scanning the entire image reading region of a reading device with the original held therein so as to read scanned data including the image data;
    a separating circuit for comparing said scanned data with given threshold data so as to separate said scanned data into first scanned data read from the original and second scanned data read from portions other than the original;
    a first adding circuit for adding together either the number of pixels read from said first scanned data of said scanned data separated into said first and second scanned data or the number of pixels read from said second scanned data thereof along a main scanning direction for each given pitch extending in an auxiliary scanning direction;
    a first region setting-up circuit for comparing, for each said given pitch, the number of the pixels added together along the main scanning direction with a predetermined number of threshold pixels so as to determine an image reading region of the original, which extends in the auxiliary scanning direction;
    a second adding circuit for adding together either the number of pixels read from said first scanned data or the number of pixels read from said second scanned data along the auxiliary scanning direction for each given pitch extending in the main scanning direction; and
    a second region setting-up circuit for comparing, for each said given pitch, the number of the pixels added together along the auxiliary scanning direction with the predetermined number of the threshold pixels so as to determine an image reading region of the original, which extends in the main scanning direction;
    whereby given processing conditions are set up based on image data set in an image reading region determined by said image reading region of the original extending in the auxiliary scanning direction and said image reading region of the original extending in the main scanning direction.

2. An image reading apparatus according to claim 1, wherein said first and/or second region setting-up circuit includes a region selecting circuit for selecting an image reading region having a maximum width as either said image reading region of the original extending in the auxiliary scanning direction or said image reading region of the original extending in the main scanning direction when either said image reading region defined by comparing the number of the pixels added together along the main scanning direction with the predetermined number of the pixels or said region defined by comparing the number of the pixels added together along the auxiliary scanning direction with the predetermined number of the pixels is formed as a plural region.

3. An image reading apparatus according to claim 1, wherein said reading unit comprises a light source for applying illuminating light to the original, an auxiliary scanning drive mechanism for displacing the original in the auxiliary scanning direction, a focusing lens for focusing either transmitted one of the illuminating light applied to the original or light reflected from the original, and a plurality of photoelectric converter elements for reading image information on the original produced by focusing either said transmitted one or said reflected light with said focusing lens.

4. A method of reading an image wherein processing conditions are set up based on image data obtained by scanning image information recorded on an original to be read, said method comprising the following steps:
    a first step of scanning the entire image reading region of a reading device with the original held therein so as to read scanned data including the image data;
    a second step of comparing said scanned data with given threshold data so as to separate said scanned data into first scanned data read from the original and second scanned data read from portions other than the original;
    a third step of adding together either the number of pixels read from said first scanned data of said scanned data separated into said first and second scanned data or the number of pixels read from said second scanned data thereof along a main scanning direction for each given pitch extending in an auxiliary scanning direction;
    a fourth step of comparing, for each said given pitch, the number of the pixels added together along the main scanning direction with a predetermined number of threshold pixels so as to determine an image reading region of the original, which extends in the auxiliary scanning direction;
    a fifth step of adding together either the number of pixels read from said first scanned data or the number of pixels read from said second scanned data along the auxiliary scanning direction for each given pitch extending in the main scanning direction;
    a sixth step of comparing, for each said given pitch, the number of the pixels added together along the auxiliary scanning direction with the predetermined number of the threshold pixels so as to determine an image reading region of the original, which extends in the main scanning direction; and
    a seventh step of setting up given processing conditions based on image data set in an image reading region determined by said image reading region of the original extending in the auxiliary scanning direction and said image reading region of the original extending in the main scanning direction.

5. A method according to claim 4, wherein said given processing conditions in said seventh step comprise scanning conditions and image processing conditions, said scanning conditions being composed of selection of an image reading region on the original, reading magnification, turning angle at the time of reading of the original, the type of halftone at the time of the halftone scanning, the number of lines on the screen, and color plates in an original film plate; and a judgment made as to whether borders (edges) with respect to the original film plate have been set up; a judgment made as to whether resist marks have been applied; and a judgment made as to whether an exposure condition at the time of the color separation of the original has been set up, and said image processing conditions being composed of set-ups of the densities of highlights and shadows, dot percent, gradation, color correction and sharpness; and undercolor removal or the like with respect to the original film plate.

* * * * *